United States Patent [19]
Williams

[11] Patent Number: 5,527,054
[45] Date of Patent: Jun. 18, 1996

[54] LEG ADJUSTMENT FOR FIFTH-WHEEL TRAILER LIFTING/LEVELING LEGS

[76] Inventor: A. Wayne Williams, 18902 Menefee Rd., Athens, Ala. 35611

[21] Appl. No.: 497,942

[22] Filed: Jul. 3, 1995

[51] Int. Cl.⁶ .................................................. B60S 9/08
[52] U.S. Cl. .................. 280/475; 280/763.1; 254/419; 254/424
[58] Field of Search .................. 280/475, 763.1; 254/419, 418, 424

[56] References Cited

U.S. PATENT DOCUMENTS

| | | | |
|---|---|---|---|
| 1,393,497 | 1/1918 | Cadman | 254/419 |
| 1,701,242 | 2/1929 | Murdoch | 254/424 |
| 2,519,364 | 8/1950 | Fredholm | 254/424 |
| 3,093,362 | 6/1963 | Schaefer | 254/424 |
| 3,211,313 | 10/1965 | Katz | 254/419 X |
| 3,537,724 | 11/1970 | Matthews | 280/763.1 |

FOREIGN PATENT DOCUMENTS

| | | | |
|---|---|---|---|
| 0160921 | 4/1954 | Australia | 280/763.1 |
| 0116948 | 7/1918 | United Kingdom | 254/424 |
| 8706202 | 10/1987 | WIPO | 280/475 |

*Primary Examiner*—Margaret A. Focarino
*Assistant Examiner*—F. Zeender
*Attorney, Agent, or Firm*—C. A. Phillips; Joseph H. Beumer

[57] ABSTRACT

An adjustable length leg and foot assembly is incorporated in a lifting/leveling leg for a fifth-wheel trailer. The foot is connected to the lower end of a threaded shaft, which in turn is received at its upper end by a nut welded to a U-shaped bracket on the leg. This enables the foot to be raised and lowered in infinite increments and avoids any need for insertion of boards or shims in making final leveling adjustments.

7 Claims, 1 Drawing Sheet

LEG ADJUSTMENT FOR FIFTH-WHEEL TRAILER LIFTING/LEVELING LEGS

FIELD OF THE INVENTION

This invention relates to leveling of trailers in parked position.

BACKGROUND OF THE INVENTION

Fifth-wheel travel trailers typically come equipped with a pair of lifting/leveling legs, one deployable under each front corner, to lift the trailer so as to allow the towing truck to pull itself out from under a hitch and to provide for leveling and supporting the trailer in parked position. These legs are movable up and down simultaneous and over a common distance by means of a gear mechanism powered by a hand crank or an electric motor. Available adjustments in the elevation of feet of the legs for the purpose of compensating for surface irregularities are limited by the telescoping adjustment feature of the legs. Vertical adjustments are made by insertion of a pin through a selected one of a series of vertically spaced-apart sets of holes in a lower portion of the leg which fits telescopingly within an upper portion of the legs, also provided with one or more sets of holes. This allows one of the legs to be brought into an exact position, with its foot on the surface, but the other leg will be out of contact if a surface depression exists. The vertical spacing between holes in such legs, at least one inch, is large enough that further adjustment by means such as insertion of a board or shim will be required. To insure proper leveling, the traveler will need to transport a supply of thin boards or shims with the trailer.

It is desired to provide a trailer lifting/leveling leg equipped with an adjustable foot which is infinitely adjustable over a range between the vertically spaced holes in the lower leg. This would eliminate any need to keep a supply of boards or other materials of variable thickness on board the trailer.

SUMMARY OF THE INVENTION

The present invention is directed to an adjustable foot for a lifting/leveling leg supporting a front corner area of a fifth-wheel trailer when parked. The foot comprises a generally dished horizontal base plate engageable with the surface on which the trailer is to be parked and a vertically extending threaded shaft secured to the base plate. A portion of the leg above the adjustable foot has a U-shaped bracket carrying a threaded aperture for receiving the threaded shaft. Adjustments to the foot height may be readily made by rotating the base plate, moving it up or down as required. The plate of the bracket which receives the shaft may be made integral with vertically extending side plates, forming a U-shaped member which is attached to the lower portion of the lifting/leveling leg by means such as a bolt passing horizontally through the U-shaped member and the leg. To provide a strong connection with the foot, the plate which supports the foot may have a threaded nut fixedly connected in alignment with an aperture through the bottom of the plate. A stop washer secured to the top of the threaded shaft is used to keep the shaft from coming off due to unexpected rotation. In order to obtain maximum stability when contacting an irregular surface, the base plate of the foot is preferably provided in a circular saucer-shaped form, flat in the center where welded to the shaft, and slightly upturned around its outer circumference. Fifth-wheeled trailers using an adjustable-height foot of the present invention may be rapidly and easily brought into a finally adjusted, level condition.

It is therefore an object of this invention to provide a lifting/leveling leg with a vertically adjustable foot that is infinitely adjustable over a range necessary to insure simultaneous contact of both lifting/leveling legs on uneven parking surfaces.

Still another object is to enable leveling without use of boards or other objects.

Other objects and advantages of the invention will be apparent from the following detailed description and claims appended hereto.

DESCRIPTION OF THE PREFERRED EMBODIMENT

Figure 3:
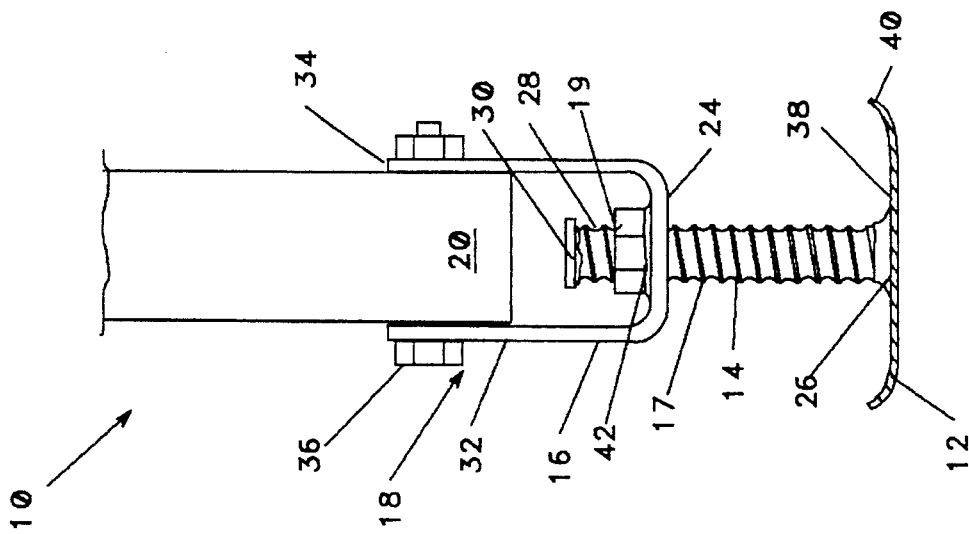
FIG. 3 is another view, partly in section and partly broken away, showing the foot mechanism attached to a lifting/leveling leg.
Figure 2:
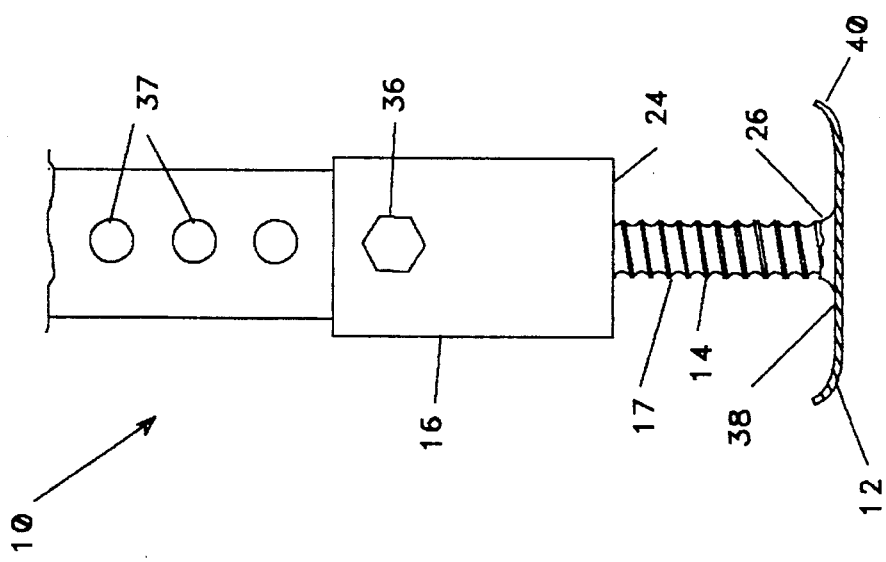
FIG. 2 is a side view, partly in section, showing the mechanism of FIG. 1 attached to a lifting/leveling leg.
Figure 1:
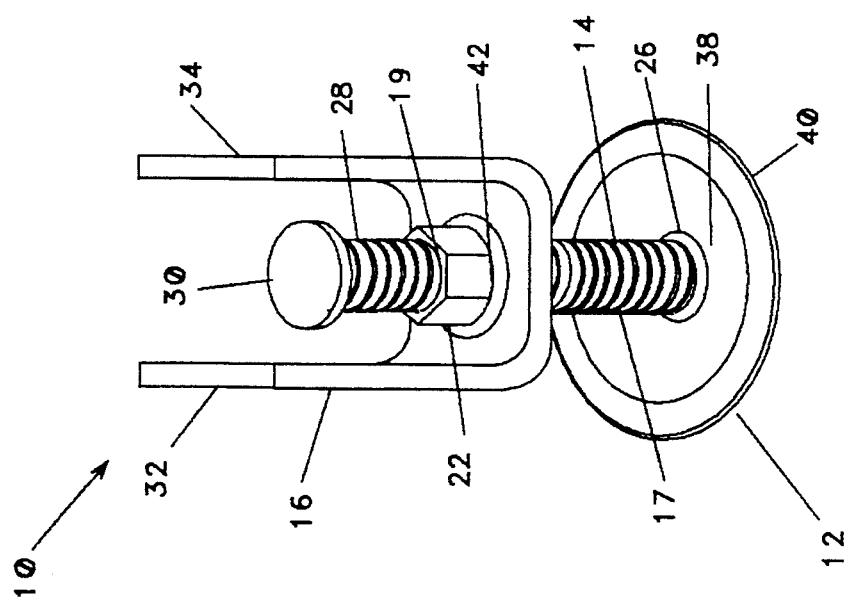
FIG. 1 is a perspective view of an adjustable lower leg and foot mechanism for a fifth-wheel trailer leg.

Referring to FIGS. 1–3 of the drawings, there is shown a lower leg and foot mechanism 10 in which a bottom foot pad 12, fixedly connected to a vertical shaft 14 by a welded joint 26, is rotatably carried in a U-shaped clevis member 16, which is secured to the base 18 of a lower portion 20 of a lifting/leveling leg of a fifth-wheel trailer. Shaft 14 has male threads 17 engageable with female threads 19 on the inside of nut 22 connected to end plate 24 of clevis member 16 by welded joint 42. Upper end 28 of the shaft 14 carries a stop washer 30 welded thereto and extending outward radially past the circumference of the shaft. This keeps the shaft and attached foot pad from coming loose and falling out as a result of rotation that might occur when the lifting/leveling leg is out of use and in a stowed position. Side plates 32, 34 of the clevis member are connected to lower portion 20 of the lifting/leveling leg by a bolt 36 extending through apertures (not shown) in the side plates and apertures 37 in portion 20.

Foot pad 12 has a saucer-shaped bottom surface to obtain effective contact with the pavement or ground in the presence of minor surface irregularities. The pad is flat in a center region 38, which may comprise a circular area of two inches in diameter for a pad with a six-inch diameter. Outside of the flat region the pad gradually tapers upward uniformly in outer region 40 to a height of one-half inch. This keeps material such as gravel under the edge of the pad from interfering with levelling action.

In order to provide adjustability of leg length over relatively large variations in ground surface levels, the lifting/leveling leg includes a feature in which portions of the leg are arranged to telescope with one another, and a pin may be inserted transversely through a selected one of a series of spaced-apart apertures. Lifting/leveling leg portion 20 as received from the manufacturer will typically have spaced-apart apertures as shown by 37 in FIG. 2 along its entire length. A selected upper one of these apertures is engaged by a pin at an upper location that would bring the foot near to, but not touching, the ground. Bolt 36, which secures the foot to leg portion 20, is connected to an aperture near the bottom thereof and is not normally moved to another aperture in the leveling process. By use of such measures, initial rough leveling may be obtained, with final, precise leveling adjustments made with the rotatable foot pad of the present invention.

The invention is useful for fifth-wheel trailers that come equipped with a pair of lifting/leveling legs, one under each front corner. By means such as a worm gear mechanism powered by a hand crank or electric motor, the legs are movable vertically upward to a retracted position within the trailer and downward to make contact with the ground. The two legs move only as a pair so that if the surface is irregular and the legs are set to the same height, only one of them will come into proper contact with the surface. The invention provides for placement of both legs in simultaneous contact with the ground after the trailer has been parked and the back wheels have been made level side-to-side by conventional means such as insertion of boards or blocks. Once the desired adjusted contact of both legs is made, the lifting mechanism is activated to raise the trailer enough to allow the truck to be driven away. With the truck removed, the legs are simultaneously retracted slightly to their adjusted position, bringing the front end back to level.

In a preferred embodiment of the invention, only one of the two front legs is equipped with an adjustable foot as described herein, the other one, of conventional construction, being movable into the required position by downward deployment after inserting a pin as in a selected aperture.

While the invention is described above in terms of specific embodiments, it is not to be understood as limited thereby, but is limited only as indicated by the appended claims.

I claim:

1. In an apparatus for leveling and supporting a fifth-wheel trailer in leveled position at a front end location thereof which comprises a pair of legs, each having a foot connected to a lower end of a said leg, said legs and attached feet disposed for deployment in vertical position underneath front corners of the trailer, each of the legs connected at an upper end thereof to lifting and retracting means for moving the legs simultaneously over a common distance upward and downward, and at least one of the legs including a vertical length adjustment mechanism, the improvement wherein said length adjustment mechanism comprises a threaded vertical shaft rotatable with respect to the ground, having a lower end fixedly connected to a said foot and an upper end threadably connected to a U-shaped bracket, said bracket having opposing apertures for receiving a bolt means securing the bracket to a lower end of a said leg whereby, upon rotation of said shaft, the foot may be raised or lowered so as to bring both feet into contact with the ground.

2. The improvement as defined in claim 1 further comprising the U-shaped bracket having a base plate disposed over said lower end of said leg, a nut is fixedly connected to said base plate, and said plate has an aperture for passage of said shaft therethrough.

3. The improvement as defined in claim 1 wherein said foot comprises a circular plate curved upward around the circumference thereof.

4. The improvement as defined in claim 3 wherein said foot has a flat shape at the center thereof over a circular area defined by one-third of the diameter of the plate.

5. The improvement as defined in claim 2 further comprising a stop washer larger in diameter than said shaft and fixedly secured to said upper end of said shaft, whereby removal of the shaft from engagement with the nut is precluded.

6. The improvement as defined in claim 2 wherein said nut is welded to said base plate.

7. The improvement as defined in claim 1 wherein said sides of said legs have defined therein a plurality of vertically spaced-apart pairs of apertures for receiving said bolt means at a selected vertical position whereby an initial rough placement of said foot near to, but not touching, the ground may be obtained.

* * * * *